(12) United States Patent
Bogner

(10) Patent No.: US 6,808,788 B2
(45) Date of Patent: Oct. 26, 2004

(54) METHOD FOR STRENGTHENING WOOD PRODUCTS AND MODIFIED UNSATURATED POLYESTER RESINS THEREFOR

(75) Inventor: Ben R. Bogner, Wheaton, IL (US)

(73) Assignee: The University of Maine, Orono, ME (US)

( * ) Notice: Subject to any disclaimer, the term of this patent is extended or adjusted under 35 U.S.C. 154(b) by 0 days.

(21) Appl. No.: 10/151,748

(22) Filed: May 17, 2002

(65) Prior Publication Data

US 2003/0215645 A1 Nov. 20, 2003

(51) Int. Cl.[7] .................. B32B 21/04; B32B 21/08; B32B 21/10; B32B 21/14; B32B 27/36
(52) U.S. Cl. .................. 428/114; 428/106; 428/113; 428/480; 428/481; 428/482; 428/535; 428/537.1; 156/297; 156/299; 156/300; 156/306.6; 156/306.9; 156/307.1; 156/307.3; 156/307.4; 156/307.5; 156/307.7; 528/288; 528/302; 528/303; 528/304; 528/305; 528/306; 528/308
(58) Field of Search ................. 428/106, 113, 428/114, 480, 482, 481, 537.1, 535; 156/297, 299, 300, 306.6, 306.9, 307.1, 307.3, 307.4, 307.5, 307.7; 528/288, 302, 303, 304, 305, 306, 308; 264/297, 299, 306.6, 307.1, 307.3, 307.4, 307.7

(56) References Cited

U.S. PATENT DOCUMENTS

| | | | |
|---|---|---|---|
| 3,373,221 A | * | 3/1968 | May .............................. 528/80 |
| 3,948,666 A | * | 4/1976 | Kitanishi et al. ......... 430/271.1 |
| 4,318,837 A | * | 3/1982 | Streets et al. ................ 524/364 |
| 4,327,145 A | | 4/1982 | Mitani et al. ................ 428/290 |
| 5,142,015 A | * | 8/1992 | Meixner et al. ............... 528/49 |
| 5,159,044 A | | 10/1992 | Bogner ........................ 528/75 |
| 5,409,764 A | * | 4/1995 | Otsuki et al. ................ 428/221 |
| 5,543,487 A | * | 8/1996 | Vick et al. ................... 528/158 |
| 5,553,487 A | | 9/1996 | Elings .......................... 73/105 |
| 5,773,531 A | * | 6/1998 | Smith .......................... 525/445 |
| 6,037,385 A | * | 3/2000 | Smith .......................... 522/93 |
| 6,105,321 A | * | 8/2000 | KarisAllen et al. ......... 52/223.8 |
| 6,183,824 B1 | * | 2/2001 | Padmanabhan et al. ....... 428/33 |
| 6,277,929 B1 | * | 8/2001 | Kitahara et al. ............. 525/440 |
| 6,281,148 B1 | | 8/2001 | Dagher et al. ................ 442/71 |
| 2001/0002609 A1 | * | 6/2001 | Dagher et al. .............. 156/176 |
| 2001/0003623 A1 | * | 6/2001 | Padmanabhan et al. .. 428/479.6 |

FOREIGN PATENT DOCUMENTS

| | | |
|---|---|---|
| FR | 2594123 | 1/1986 |
| GB | 1052667 | 11/1964 |
| GB | 1337131 | 12/1970 |
| JP | 5655247 | 5/1981 |
| JP | 04288379 | 10/1992 |

OTHER PUBLICATIONS

"Bonding E–glass to Wood Using a Modified Polyester Resin", Bogner et al., COMPOSITES 2001 Convention and Trade Show; Composites Fabricators Association (CFA); Oct. 4, 2001.

* cited by examiner

*Primary Examiner*—Vivian Chen
(74) *Attorney, Agent, or Firm*—Mary Jo Kanady

(57) ABSTRACT

The strength of wood composites, including hybrid composites comprising wood members bonded to reinforced polyester members, is improved by modifying the polyester components with a polyisocyanate. Wood composites adhesively bonded with polyester resins modified according to this invention are particularly desirable for use in applications where exterior exposure is contemplated.

19 Claims, No Drawings

METHOD FOR STRENGTHENING WOOD PRODUCTS AND MODIFIED UNSATURATED POLYESTER RESINS THEREFOR

BACKGROUND OF THE INVENTION

This invention relates generally to adhesives, and more particularly to an improved adhesive system for bonding wood. Still more particularly, the invention is directed to unsaturated polyester resin systems suitable for bonding wood in the manufacture of wood composites, to methods of manufacturing wood composites, and to fiber-reinforced wood composites comprising such resin systems.

Glue-laminated timbers, more generally described as structures comprising parallel assemblies of face-laminated wood, have been used successfully as structural elements in buildings for over a century. The glue lamination process allows the natural flexibility of timber to be bonded into almost any rigid shape. These engineered wood structures have a superior strength-to-weight ratio and may be reinforced to meet particular design requirements in the fabrication of light, space-creating structures.

More recently, there have been developed hybrid composites wherein the wood components are combined with synthetic fibers such as glass, carbon or Kevlar, and a resin system to give greater strength, stiffness and ductility to timber. Unlike traditional steel and aluminum reinforcement, fiber-reinforced plastic (FRP) components may be engineered to match and complement the orthotropic properties of wood. Consequently, incompatibility problems between the wood and the reinforcing FRP are minimized, and the resulting hybrid materials have properties derived from each separate material. In addition, hybrid composite technology allows the use of a lower-grade wood to achieve the same, if not better, results.

Good bond strength between the wood components and the FRP reinforcement is important. Red and white oak, birch, hard maple and other high density hardwoods are difficult to bond. Moreover, if the wood product has first been treated, for example, with a preservative, or if the wood is used in wet conditions, the performance of the adhesive may be impaired. Repeated water saturation, cyclical moisture exposure followed by drying, or direct exposure to adverse weather conditions create delaminating stresses that lead to separation at the glue-line, or tension failure in the wood near the glue-line. For example, epoxy adhesives provide a bond that is as strong as the wood itself as long as the wood remains dry in service, but delaminates in wet-use conditions. Water-based wood adhesives, such as phenolics, resorcinolics, isocyanates, ureas and melamines, perform well only on wood that has not been chemically or physically altered.

Methods have been disclosed for enhancing the adhesion of a variety of adhesives to wood. For example, in U.S. Pat. No. 5,543,487, there is disclosed a resorcinol-formaldehyde derivative useful as a primer or coupling agent in bonding lumber treated with CCA preservative for service in exterior exposure conditions. The disclosure of U.S. Pat. No. 5,543,487 is incorporated herein by reference in its entirety. According to the patentees, the hydroxymethylated resorcinol coupling agent improves the adhesion of phenol-resorcinol, epoxy, and isocyanate-based adhesives to wood, including hard woods and wood treated with preservatives. The coupling agent has also been disclosed to improve the bonding of glass fiber-reinforced vinyl ester components to wood in the manufacture of hybrid wood composites.

Epoxy resins have long been used as the matrix resins for FRP reinforcement components. More recently, pultruded FRP sheets comprising glass fiber impregnated with phenol-resorcinol formaldehyde adhesives have been disclosed as reinforcement for hybrid composites. The panels are readily bonded to wood, or to one another, using the phenol-resorcinol formaldehyde (PRF) adhesives commonly used in the fabrication of laminated wood structural members. Alternative matrix resins including polyester, vinyl ester, polyimides and the like have also been suggested for this use, though adhesives for these materials that form adequate bonds with wood have not been identified.

The least expensive resins available to the FRP industry are polyester resins. Polyester resins are conveniently produced by dissolving an unsaturated, generally linear polyester in an inexpensive vinyl-type active monomer such as, for example, styrene, methyl styrene, diallyl phthalate, or the like. Cure is effected using peroxide catalysts, together with suitable promoters, or heat. Polyesters with a wide range of mechanical properties are readily available, and many are formulated to have superior resistance to wet or corrosive environments.

Although the polyester resins generally available to the art are compatible with glass fibers, most do not adhere well to wood or other lignocellulosics. Polyester adhesives have not found acceptance as adhesives for bonding wood, and the adhesives commonly employed in the manufacture of hybrid wood composites are not well suited for bonding FRP polyester reinforcement panels to each other, or to wood.

A method for improving the performance of polyesters as adhesives in bonded wood products would find wide acceptance in the art. Polyester adhesives which are capable of forming bonds to wood with adequate bond strength, and which are resistant to external exposure, would provide the industry with a wider range of materials suitable for use in the manufacture of wood composites. Pultrusions comprising fiber-reinforced polyester resins modified to have good adhesion to wood could provide low cost reinforcement for the manufacture of a wide range of hybrid composites.

SUMMARY OF THE INVENTION

The invention is directed to a method for improving the adhesion of polyester resins to wood and other lignocellulosic materials, and to modified unsaturated polyester resins having improved adhesion to wood. The method comprises modifying an unsaturated polyester resin composition with up to about 20 wt. % of a polyisocyanate.

Unsaturated polyester resins modified with a polyisocyanate are particularly useful in constructing composites from difficult-to-bond woods such as hardwoods, or softwoods and hardwoods treated with chromated copper arsenate (CCA) or other preservatives. Wood composites wherein the bonding surfaces of the wood are primed with a resorcinol-formaldehyde derivative coupling agent and then bonded with the invented modified polyester resins are particularly resistant to delamination. The invention may thus be further characterized as being directed to improved composite wood structures comprising the invented polyester resin composition and to methods for constructing such composites.

DETAILED DESCRIPTION OF THE INVENTION

Modified polyester resins suitable for use in constructing wood composites according to the invention are compositions comprising an unsaturated polyester dissolved or dispersed in a liquid ethylenically unsaturated monomer copolymerizable with the unsaturated polyester, together with up to 20 wt. % of an organic polyisocyanate.

Unsaturated polyesters useful in the practice of the invention may be generally described as oligomers obtained by the polyesterification of at least one unsaturated dicarboxylic acid or anhydride with at least one polyhydric alcohol, and, preferably, at least one saturated or aromatic polycarboxylic acid or anhydride. Typical unsaturated dicarboxylic acids include maleic acid, fumaric acid, citaconic acid, chloromaleic acid, allyl succinic acid, itaconic acid, mesaconic acid, their anhydrides and mixtures thereof, with maleic anhydride being the preferred choice. Examples of polyhydric alcohols which are useful in the invention include neopentyl glycol, ethylene glycol, diethylene glycol, triethylene glycol, propylene glycol, dipropylene glycol, 1,4-butanediol, polyethylene glycol, mannitol, 1,2-propanediol, 1,6-hexanediol, 1,3-butylene glycol and mixtures thereof, with propylene glycol being preferred. Propylene glycol offers good physical properties at low cost. Better weathering and improved resistance to alkaline chemicals can be achieved by using neopentyl glycol.

Typical polycarboxylic acids include aromatic dicarboxylic acids such as isophthalic acid, orthophthalic acid, terephthalic acid and the like, and aliphatic dicarboxylic acids such as succinic acid, adipic acid, chlorendic anhydride and the like, and mixtures thereof, with isophthalic acid being the preferred choice.

Typical molecular weights of unsaturated polyesters (on a solid basis) useful in the invention are between about 1000 and about 2500 g/mole. Generally, the polyester will have an acid number in the range of from about 5 to about 75 mg, preferably from about 5 to about 50 mg KOH/g of resin. The resin hydroxyl number will depend upon the resin acid number and the stoichiometric ratio of glycol/acid. Preferably, the hydroxyl number will lie in the range of from about 30 to about 120 mg KOH/g of resin.

The polyesters typically are dissolved in about 20 to about 60 wt. % of a liquid ethylenically unsaturated monomer copolymerizable with the unsaturated polyester to form a polyester resin composition. Monomers that may be useful for these purposes include vinyl aromatic monomers such as, for example, styrene, vinyl toluene, t-butylstyrene, chlorostyrene, divinylbenzene, a-methylstyrene, and acrylic monomers such as diacetone-acrylamide, hydroxyethyl acrylate, hydroxypropyl acrylate, hydroxypropyl methacrylate, methyl methacrylate, butyl methacrylate, and butyl acrylate. Preferably, the monomer will be a vinylaromatic monomer, more preferably styrene or vinyl toluene. Styrene will be preferred for most applications because it provides an economical monomer solution, is a good solvent for unsaturated resins, and enables low viscosity at lower monomer levels.

The amount of the monomer in the resin composition will depend upon a variety of factors including the particular monomer selected, the molecular weight of the polyester, and the desired application viscosity of the resin. Generally, the amount will lie in a range of from 25 to 55 percent by weight of the combined weight of polyester and monomer. Preferably, the resin composition will comprise unsaturated polyesters based on isophthalic acid, maleic anhydride and propylene glycol dissolved in from about 30 to about 50 wt. % styrene. Isophthalic resins, also termed isopolyester resins, are readily formulated to provide resin compositions with enhanced resistance to a variety of environmental conditions. Generally, the resin solution will also contain a polymerization inhibitor.

A wide variety of polyester resin compositions suitable for the purposes of this invention, including the preferred isopolyester resins, are readily available from commercial sources. Commercial resins may be tailored for a particular use or fabricating operation, for example, in pultrusion, filament winding, compression molding and the like, and may be further formulated for use in coating operations and in impregnating a variety of fabric reinforcement, woven and non-woven mat structures and the like. Methods for the manufacture of unsaturated polyester resins are also well known and widely employed commercially. For example, isophthalic resins are manufactured by two-stage processing to facilitate the dissolution of the isophthalic acid. In the first stage, the glycol and isophthalic acid react at elevated temperatures, typically about 210° C., under an inert atmosphere to produce a clear melt. High pressure processing, typically 207 kPa (30 psi), and esterification catalysts, such as hydrated monobutyl tin oxide, are also widely employed to reduce the cycle times of two-stage processing. Maleic anhydride is added in the second stage and the final resin is completed at a temperature of about 240° C. in order to control color and molecular weight development. Isophthalic resins intended for corrosion applications are processed to the highest molecular weight that can meet the desired viscosity requirement at a given styrene content. The typical reaction cycle is about 24 hours.

In commercial operations, the polyesterification will normally be carried out in stainless steel vessels ranging from 8,000 to 50,000 liters, and heated and cooled through internal coils. Blade agitators revolving at from 70 to 200 rpm are effective in stirring the low viscosity mobile reactants, which are maintained under an inert atmosphere of nitrogen or carbon dioxide during the reaction at temperatures up to 240° C.

The organic polyisocyanate component of the modified polyester resin will preferably be a diisocyanate, and may be any of the wide variety of diisocyanates available to the resin arts and widely used in the production of urethane resins. Typical diisocyanates suitable for use with unsaturated polyesters include aliphatic diisocyanates such as, for example, isophorone diisocyanate (IPDI), hexamethylene diisocyanate (HMDI) and the like, and aromatic diisocyanates including methylene diphenyl diisocyanate (MDI), toluene diisocyanate (TDI), and the like. Polyisocyanates such as Isonate 143L (an oligomeric MDI from Dow Chemical) may also be useful.

Aliphatic diisocyanates will be preferred, and isophorone diisocyanate will be most preferred. Aliphatic diisocyanates generally react with the polyester component more slowly, and resin formulations comprising aliphatic diisocyanates will generally have a longer pot life. IPDI has both a primary (fast reacting) isocyanate group and a secondary (slower to react) isocyanate group. The IPDI thus can attach quickly to the polyester through reaction of the primary isocyanate group with the hydroxyl functionality of the polyester. Crosslinking and gel formation, which occur through reaction of the secondary isocyanate group with the polyester, proceed slowly until heat is generated by the curing process, giving the matrix resin a latent reactivity. While not wishing to be bound by a particular theory of operation, it appears that the latent cure of the second isocyanate group provides means for bonding the matrix resin to the wood surface.

Generally, the modified polyester resin composition will comprise up to about 20 wt %, preferably from about 1 to about 20 wt %, more preferably from about 5 to about 10 wt, % of the diisocyanate, based on the combined weights of isocyanate and polyester resin. Though still higher levels of diisocyanate may also be found effective in improving adhesion, isocyanate compounds are costly. Thus, the amount of isocyanate employed will preferably be no greater than will be required to obtain good adhesion of the polyester.

The composition may further include conventional polymerization catalysts such as, for example, benzoyl peroxide, methyl ethyl ketone peroxide, lauroyl peroxide, cumene hydroperoxide, dicumyl peroxide, t-butyl perbenzoate, or the like, to catalyze the copolymerization of the unsaturated polyester resin and monomer. Small amounts of organic cobalt initiators, such as cobalt naphthenate, cobalt octoate and the like, are also preferably added to facilitate the catalyst breakdown. The amount of catalyst, as well as the particular catalyst selected, will depend in part upon the intended end use and the particular unsaturated polyester composition. For example, obtaining a gel time appropriate for hand lay-up fabrication at a particular temperature may require a low level of peroxide, while higher amounts will be employed when rapid cures are desired. Selection of the catalyst and determination of the particular amounts is well known and understood by those skilled in the resin arts.

Generally, the diisocyanate and the polymerization catalyst components will be added to the polyester composition just prior to the fabrication operation. The diisocyanate will preferably be added prior to adding the polymerization catalyst.

Optionally, the modified polyester resins of this invention may further include additional additives such as stabilizers, flame retardants, fillers, viscosity modifiers, thickeners, dyes, pigments, mold release agents, water scavengers, internal lubricants, low profile additives and other processing aids. Such additives will be selected and compounded with the resins in amounts according to methods and principles well-known and understood by those skilled in the art.

In forming a wood composite, the surfaces of the wood will preferably be primed with a coupling agent. Priming wood surfaces with hydroxymethylated resorcinol (HMR) is disclosed in U.S. Pat. No. 5,543,487 to enhance adhesion of wood to epoxy, phenol-resorcinol, and emulsion-polymer isocyanate adhesives. As disclosed in the art, the HMR coupling agent is prepared by combining resorcinol and formaldehyde or paraformaldehyde in a 3:1 molar ratio of aldehyde-to-resorcinol in water under mildly alkaline conditions to yield a 5% solids aqueous solution. According to patentees, the coupling agent will be spread on a wood surface 4–6 hours after mixing the ingredients of the coupling agent to create effective coupling between the adhesive and the wood surface. Generally, the water will be evaporated from the primed surfaces before the polyester component is spread on the surface.

Timbers laminated from HMR-primed treated lumber are disclosed to have a higher resistance to delaminating stresses caused by repeated water saturation, cyclical moisture exposure and drying, or direct exposure to adverse weather conditions. HMR primer solution may be used with a variety of wood substrates including veneer, flakes, and fibers that have been protected from biological deterioration by treatments such as CCA or other inorganic preservatives. The coupling agent is also disclosed to more effectively bond red and white oak, birch, hard maple, and other difficult-to-bond, high density woods, and wood surfaces that have become deactivated through long-term aging and migration of wood extractives to the surfaces.

In constructing laminates, multiple wood laminae, preferably elongate boards, are bonded together. In glue-laminated timbers, the components are configured according to manufacturing standards 117-93 of the American Institute of Timber Construction (AITC) of Englewood, Colo. The process is similarly applicable to constructing other wood structural members, including laminated veneer lumber, parallel strand lumber and wood I-beams, and reinforced wood composites.

Generally described, the wood composites of this invention comprise a wood member, a second member disposed at a predetermined location against the wood member, and a modified polyester resin disposed between the opposed surfaces, i.e. the bonding surfaces, of said members to bond them together. The second member may be a wood member. Alternatively, the second member may be a reinforcing panel such as, for example, an FRP panel, preferably a panel comprising the invented fiber-reinforced modified polyester resin.

In a preferred embodiment of the invention, a plurality of wooden members are disposed in substantially parallel relation to one another; at least one FRP reinforcing panel is disposed at a predetermined location between two of the members; and the modified polyester resin component is disposed between the opposed or bonding surfaces of the members and the reinforcing panel to bond them together. In further embodiments, the additional wooden members of the hybrid reinforced composite may be bonded to each other with conventional adhesives other than the invented modified polyester resin. In still further embodiments, the wooden members and the reinforcing panel may be bonded together to form a variety of commercial structures, including glulam beams, LVL beams, PSL beams, LSL beans, I-joists and the like, or flat composite panels such as plywood.

The method of fabricating wood composites comprising at least one wood member according to the invention comprises the steps of coating or impregnating the bonding surfaces of at least one of the members to be bonded with the invented modified polyester resin, disposing a second member against the impregnated member, and bonding the members together to form a wood composite. In a preferred embodiment, said second member is a reinforcing panel such as an FRP panel comprising fiber-reinforced modified polyester resin, and in a further preferred embodiment, the bonding surface of an additional wooden member is disposed against an opposite surface of the FRP panel, and bonded thereto with the invented polyester resin.

Conventional spreading methods may be used to spread the modified polyester resin on the surfaces to be bonded. Spreading one-half of the adhesive on each surface within each bondline is preferred for maximum adhesion. Alternatively, the polyester resin may be spread on only one surface and then transferred to the opposite surface by closing the joint.

After the adhesive-bearing surface is brought into contact with the desired surface, the reinforcement and wood lamina are typically clamped together to ensure optimal bonding under pressure. In clamping large structures such as laminated structural timbers, pressures over 100 psi are generally employed to form a glue line thickness typically less than 0.004 inches. Typical clamp time will be 8 to 10 hours; a post-clamp cure time increases the strength of the bond and allows for more complete curing.

The invention described herein will be better understood by consideration of the following examples, which are offered byway of illustration.

EXAMPLES

Polyester Resins. Unsaturated polyester was prepared by a two-stage method, and then diluted with styrene. The following preparation of an isopolyester with a 1:2 mole ratio of isophthalic acid to maleic anhydride will serve to illustrate the process.

A four-liter glass resin reactor fitted with a mechanical stirrer, a steam-jacketed distillation column, a water-cooled condenser, and a nitrogen sparger was charged with 997 g. (6.0 mole) of isophthalic acid, 1119 g. (14.7 mole) of propylene glycol, and 637 g. (6.0 mole) of diethylene glycol.

Nitrogen flow rate was 0.5 standard cubic feet per hour. The reaction mixture was heated to a temperature of 190° C. over a period of about 90 min., and then gradually increased to 204° C. under reflux. The progress of the esterification was monitored by acid number titration, and the water that formed as the esterification proceeded was removed from the mixture by distillation. After about 5 hours, at an acid number of 18.3 mg KOH/gm, the molten polymer was cooled to 93° C. and held overnight; the acid number of the resin was 16.3 mg KOH/gm the following morning.

Propylene glycol lost by distillation was determined by measurement of refractive index of the condensate; 8.4 grams of propylene glycol were added to the reactor. The resin mass was heated to 160° C., and 1177 grams (12.0 mole) of molten maleic anhydride were added to the reactor. The temperature of the reaction mixture was increased to 230° C. over about 2 hours and held for four hours while removing water by distillation, until an acid number of 16.8 mg KOH/g was reached. The hydroxyl number of the resin, calculated from the final acid number and the stoichiometric ratio of glycol/acid, was 102 mg KOH/gram.

The reaction mass was cooled to a temperature of about 180° C., 0.52 grams of hydroquinone was added, and the hot polymer melt was poured into 1500 grams of styrene (styrene/maleic ratio=1.5) with good agitation and cooling to maintain the temperature of the polyester/styrene solution below about 80° C. The resulting polyester resin was then cooled to room temperature, filtered, and stored.

Composites. The following materials and procedures were used to provide composite test specimens:

Sugar Maple (*Acer saccharum*), conditioned to 12% equilibrium moisture content (EMC), was used as the wood substrate.

HMR-treated substrates had the coupling agent applied 16 hours before the resin application to allow the solvent (water) to evaporate.

Where modified polyester resin was employed, the modified polyester resin was prepared immediately before application by adding the diisocyanate component to the uncatalyzed polyester resin, followed by 0.5 wt. %, based on total resin, of methyl ethyl ketone peroxide (MEKP) catalyst. Unmodified polyester was similarly prepared, omitting the isocyanate component.

The FRP reinforcement was formed using 26 oz/yd uniaxial E-glass manufactured by Brunswick Technologies, Inc. (Compagnie de Saint-Gobain). The fabric was wet out by hand with an equal weight of polyester resin composition and a fabric roller. Four layers of the impregnated fabric were laid up by hand to provide FRP reinforcement containing 50 wt. % resin.

A thin layer of catalyzed polyester resin was applied to the wood substrate, followed immediately by the wetted out FRP reinforcement, which was then "sandwiched" by adding a second wood substrate, coated on the bonding face with resin. The composite was clamped at 37 psi (255 kPa). After 24 hours of clamping, the specimens were reconditioned back to 12% EMC.

Two different types of composite specimens were manufactured: shear testing composites that comprised three members, configured as wood/FRP/wood, and cyclic delamination specimens that comprised four members and a phenol-resorcinol-formaldehyde (PRF) adhesive, configured as wood/PRF)wood/FRP/wood. The wood/PRF/wood sections of the cyclic delamination test specimens were bonded with PRF adhesive several days in advance to allow for the resin to cure and the wood to recondition.

The adhesive shear strength testing was carried out substantially as described in ASTM standard D 905, with modification to test the compression shear strength of the bond between a wood substrate and an FRP substrate. The standard ASTM D905 method tests the shear strength of the bond between two adhesively-bonded wood substrates. The shear block was cut to D 905 standard specifications and tested using a servo-hydraulic Instron™ tester and the specified testing fixture. Care was taken during cutting to ensure that the plane of failure would be located in the wood-FRP interface, rather than in the FRP matrix. Samples were loaded at a rate of 30.5 cm/s.

Examples 1–4 and Comparison Examples C-1 and C-2

Composite shear test specimens and control specimens were prepared as described above, with and without HMR priming and without being heat-cured. The averaged mean shear strength and substrate failure determinations for composite test specimens are summarized in the following Table 1. The specimens were tested under dry conditions.

TABLE 1

| Ex. No. | IPDI Wt. % | Shear Strength MPa (Ksi) | Substrate Failure, % |
|---|---|---|---|
| Unprimed Substrate | | | |
| C-1 | 0 | 6.55 (0.95) | 0 |
| 1 | 5 | 10.60 (1.54) | 1 |
| 2 | 10 | 11.00 (1.60) | 2 |
| HMR-primed Substrate | | | |
| C-2 | 0 | 15.54 (2.25) | 22 |
| 3 | 5 | 23.02 (3.34) | 74 |
| 4 | 10 | 18.74 (2.71) | 99 |

It will be apparent from a consideration of the shear strength properties for the composites and control composites set forth in Table 1 that shear strength was improved by adding IPDI diisocyanate to the polyester resin. Only nominal improvement was realized for unprimed substrates (Examples 1 and 2, and control example C-1). In these specimens, failure occurred largely at the interface, and not in the substrate.

Priming the bonding surfaces of the wood substrate with HMR (hydroxymethylated resorcinol) before bonding substantially improved shear strength for wood-FRP composites bonded with unmodified polyester resin; compare C-1 and C-2. However, shear failure for test specimens bonded with unmodified polyester resin occurred largely at the resin-wood interface.

Bonding HMR-treated wood with isocyanate-modified polyester (Examples 3 and 4) provided substantial further improvement in adhesion. In these specimens, failure occurred largely within the substrate, indicating that the adhesion between polyester and wood was stronger than the cohesive strength of the wood and FRP substrates.

AITC 200-92 (Table C, Section 5.4.2.3 for Sugar Maple) requires a minimum average dry shear strength of 14.48

MPa (2.10 Ksi); the minimum attributable to wood failure is 75%. The average dry shear strength of hybrid wood-FRP composites bonded with modified polyester and using wood pre-treated with HMR coupling agents will thus be seen to meet the AITC standards.

Examples 5 and 6 and Comparison Example C-3

In Examples 1–4, the polyester component was cured at room temperature, using a low temperature peroxide. In the following examples, the shear test specimens were prepared using HMR-primed substrate and the same modified polyester component employed in Examples 3 and 4, substantially as outlined above. The specimens were then heated at 60° C. for 1 hour to ensure complete cure of the fiber-reinforced resin component. The strength properties for the heat-cured specimens, together with the properties for comparable specimens that were not heat-cured, are summarized in the following Table 2.

TABLE 2

| Ex. No. | IPDI Wt. % | Shear Strength MPa (Ksi) | Substrate Failure, % |
|---|---|---|---|
| Heat cured | | | |
| C-3 | 0 | 16.83 (2.44) | 35 |
| 5 | 5 | 21.20 (3.07) | 87 |
| 6 | 10 | 17.38 (2.52) | 100 |
| Not heat-cured | | | |
| C-2 | 0 | 15.54 (2.26) | 22 |
| 3 | 5 | 23.02 (3.34) | 74 |
| 4 | 10 | 18.74 (2.71) | 99 |

It will be apparent that for primed substrates, applying heat did not have a significant effect on shear strength of the hybrid composites, though minor increases in the substrate failure mode were observed.

Examples 7 and 8

Hybrid wood-FRP composites bonded with modified polyester were tested in a "wet" state. Composite shear test specimens were prepared with polyester resin modified with 10 wt. % IPDI diisocyanate using primed wood substrates, substantially as described for Examples 4 and 6. The specimens for Example 7 were tested without heat curing, as described for Example 4; the specimens for Example 8 were heat cured, substantially as described for Example 6.

The shear test specimens were placed in water in a pressure vessel. The vessel was evacuated to a pressure of 508–635 mm Hg (−4.9 to −2.4 psig) for 30 minutes, then pressurized to a pressure of 517 kPa (60 psig) for 120 minutes. The specimens were then removed and tested directly (still wet). Maximum loads and percent substrate failure are summarized in the following Table 3.

TABLE 3

| Ex. No. | Heat Cured? | Shear Strength MPa (Ksi) | Substrate Failure, % |
|---|---|---|---|
| Wet test | | | |
| 7 | No | 8.58 (1.24) | 100 |
| 8 | Yes | 9.29 (1.35) | 99 |
| Dry test | | | |
| 4 | No | 18.74 (2.71) | 99 |
| 6 | Yes | 17.38 (2.52) | 100 |

It will be seen that the shear strength of wood-FRP composites bonded with modified polyester resin, whether heat cured or not, is substantially reduced by exposure to wet conditions. Substantially all of the failure occurred in the substrate.

Test of shear strength and substrate failure of bonds under dry conditions are not indicative of the durability of the bonds. Delamination resistance is better tested in a cyclic delamination test. The cyclic delamination method used for testing the wood-FRP hybrids was a modified version of ASTM D-1101, wherein an FRP layer replaces the adhesive component in the last bond line.

Cyclic delamination specimens were prepared substantially as described above and subjected to three cycles of vacuum-pressure soaks. The test specimens were placed in a water tank; the tank was closed and a vacuum of 508–635 mm Hg (−4.9 to −2.4 psig) was applied for 30 minutes; and then a pressure of 517 kPa (60 psig) was applied for 120 minutes. After the vacuum-pressure cycle was completed, samples were removed and dried at 60° C. until the sample was within 15% of its original weight. At the end of the cycle, the bond line was examined for any measurable failure. Specimens with greater than 5% total bond line failure were rated as failed. If the bond line failure was less than 5% total, then the specimen was subjected to a second cycle. After the second cycle, the bond line was again examined, and, for specimens with less than 5% total bond line failure, a third cycle was run.

The results are summarized in the following Table 4, where the number of specimens that fail are reported for each cycle.

TABLE 4

| | | HMR | | Specimens | # of Specimens Failed | | |
|---|---|---|---|---|---|---|---|
| Ex. No. | IPDI Wt. % | primed? | Heat cured? | tested # | Cycle 1 # | Cycle 2 # | Cycle 3 # |
| C-1 | 0 | No | No | 3 | 3 | — | — |
| C-2 | 0 | Yes | No | 3 | 3 | — | — |
| C-3 | 0 | Yes | Yes | 3 | 3 | — | — |
| 1 | 5 | No | No | 3 | 3 | — | — |
| 3 | 5 | Yes | No | 3 | 1 | 0 | 0 |
| 5 | 5 | Yes | Yes | 3 | 0 | 0 | 0 |
| 4 | 10 | Yes | No | 3 | 0 | 0 | 0 |
| 6 | 10 | Yes | Yes | 3 | 0 | 0 | 0 |

All three specimens of the control examples experienced total failure at the beginning of the first cycle (during vacuum stage of treatment), as did the three specimens of Example 1, prepared without priming the wood substrate.

For the composites prepared using primed wood substrate with 5% IPDI-modfied polyester (Example 3), one test specimen failed after one cycle; the remaining two completed three full cycles with no delamination at the wood-FRP bond line. It will be seen from the performance of the 5% and 10% IPDI-modified polyester examples (Examples 4–6) that all but one of the test specimens employing HMR primed wood components and modified polyester were able to complete three cycles with no delamination.

On visual examination of the test specimens that passed the cyclic delamination tests, honeycombing and checks in the wood substrate were seen. These are due to the extreme stresses induced in the samples from the rapid moisture uptake and drying cycling. Bond line adhesion strength thus appears to be greater than the internal strength of the wood substrate for hybrid wood composites according to the invention; the wood failed due to these stresses before the bond line failed.

The invention will thus be seen to be directed to a method for improving the adhesion of unsaturated polyester resins to wood surfaces wherein the unsaturated polyester resin is modified with from 1 to about 20 wt. % polyisocyanate, based on the weight of the polyester resin. The modified polyester resin is particularly useful in surface-bonding wood in forming laminated wood structures, including hybrid wood composites comprising fiber reinforcement. The adhesion to wood is further improved by pre-treating the wood surface with hydroxymethylated resorcinol. The invention will be understood to be further directed to the modified unsaturated polyester resins, to wood composites including fiber-reinforced wood composites comprising such polyester resins, and to methods for making such composites.

Wood composites, including hybrid wood composites comprising polyester resins modified with polyisocyanate according to this invention, are useful in a wide variety of applications and will be particularly desirable for use in applications where exterior exposure is contemplated. The polyester resins are readily processable, and may be formulated to provide clear resin adhesives with excellent resistance to UV exposure. The invented composites and the method of their manufacture may thus be used in the production of boat hulls, wood aircraft parts and air frames, wind generator blades and components, skis, hockey sticks, bows and gun stocks, railings, columns, stair treads, fences, window and door components, structural beams and timbers of preservative-treated wood, laminated preservative-treated bridge components, and ship structural components. The isocyanate-modified polyester resins of this invention may also be found useful in the production of manufactured wood from wood fiber in a variety of forms, including flake, chip, crushed and pulverized, as well as from a wide variety of other natural fibers such as hemp, kenaf, flax and the like, pulverized peanut shells, cherry pit flour, and the like.

While the invention has been illustrated by means of specific embodiments, these are not intended to be limiting. Further additions and modifications will be readily apparent to those skilled in the art, and such modifications and additions, as well as compositions, formulations, and articles embodying them, are contemplated to lie within the scope of the invention, which is defined and set forth in the following claims.

What is claimed is:

1. A method for improving the adhesion of an unsaturated polyester resin comprising an unsaturated polyester and a copolymerizable unsaturated vinylaromatic monomer to a lignocellulosic material comprising adding to said resin from 1 to about 20 wt. %, based on weight of polyester resin, of a polyisocyanate.

2. The method of claim 1 wherein said polyisocyanate is selected from the group consisting of isophorone diisocyanate, hexamethylene diisocyanate, methylene diphenyl diisocyanate, toluene diisocyanate, and oligomeric methylene diphenyl diisocyanate.

3. The method of claim 1 wherein said polyisocyanate is an aliphatic diisocyanate.

4. The method of claim 1 wherein said polyisocyanate is isophorone diisocyanate.

5. The method of claim 1 wherein said polyester is the polyesterification product of an aromatic dicarboxylic acid or an ester or anhydride thereof; an unsaturated dicarboxylic acid or an ester or anhydride thereof, and at least one polyhydric alcohol.

6. The method of claim 5 wherein said polyester has an acid number in the range of from about 5 to about 70 mg KOH/g of resin.

7. The method of claim 5 wherein said monomer is styrene.

8. A composite comprising a wood member, a second member disposed at a predetermined location against a surface of said wood member, and a modified polyester resin disposed between the opposed surfaces thereof to bond them together, said resin comprising an unsaturated polyester, a copolymerizable unsaturated vinylaromatic monomer, and from about 1 to about 20 wt. %, based on weight of polyester resin, of a polyisocyanate.

9. The composite of claim 8 wherein said second member is a fiber-reinforced polyester panel.

10. The composite of claim 8 wherein the bonding surface of said wood member is primed with hydroxymethylated resorcinol.

11. The composite of claim 8 wherein said unsaturated polyester is the polyesterification product of an aromatic dicarboxylic acid or an ester or anhydride thereof; an unsaturated dicarboxylic acid or an ester or anhydride thereof, and at least one polyhydric alcohol.

12. The composite of claim 8 wherein said polyisocyanate is an aliphatic diisocyanate.

13. The composite of claim 8 wherein said modified polyester resin comprises an isopolyester resin and said polyisocyanate is isophorone diisocyanate.

14. The composite of claim 8 further comprising at least one additional wood member disposed against the opposing surface of said second member and bonded thereto.

15. A composite comprising a plurality of wood members disposed in substantially parallel relation to one another, at least one FRP reinforcing panel disposed between two of said members, and a modified polyester resin disposed between the opposing surfaces of said members and said reinforcing panel bonding them together, said polyester resin comprising an unsaturated polyester, a copolymerizable unsaturated vinylaromatic monomer, and from about 1 to about 20 wt. % of a polyisocyanate.

16. The composite of claim 15 wherein the bonding surfaces of said wood members are primed with hydroxymethylated resorcinol.

17. A method for forming a composite structure comprising a plurality of members including at least one wood member, said method comprising impregnating the bonding surfaces of at least one of the members to be bonded with a modified polyester resin comprising an unsaturated polyester, a copolymerizable unsaturated vinylaromatic monomer, and from about 1 to about 20 wt. %, of a polyisocyanate; disposing a second member against the resin-impregnated bonding surface of said member, and bonding said members together.

18. The method of claim 17 further comprising the step of priming the bonding surface of said wood member with hydroxymethylated resorcinol.

19. In a polyester resin bonded to a lignocellulosic material and a second material comprising an unsaturated polyester and a copolymerizable unsaturated vinylaromatic monomer, the improvement wherein the composition further comprises from about 1 to about 20 wt. %, based on weight of polyester resin, of a polyisocyanate.

* * * * *